United States Patent
Hosokawa et al.

[11] Patent Number: 6,090,026
[45] Date of Patent: Jul. 18, 2000

[54] AUTOMATIC TOOL EXCHANGING MACHINE

[75] Inventors: Yutaka Hosokawa, Fuji; Toshihiro Ueta, Mishima; Hirohiko Honda, Numazu, all of Japan

[73] Assignee: Toshiba Kikai Kabushiki Kaisha, Tokyo, Japan

[21] Appl. No.: 09/191,542

[22] Filed: Nov. 13, 1998

[30] Foreign Application Priority Data

Nov. 13, 1997 [JP] Japan .................................. 9-329623

[51] Int. Cl.[7] .................................................. B23Q 3/157
[52] U.S. Cl. ............................. 483/39; 483/36; 483/38; 483/44
[58] Field of Search ................... 483/36, 38, 39, 483/44, 49

[56] References Cited

U.S. PATENT DOCUMENTS

| | | | |
|---|---|---|---|
| 4,072,236 | 2/1978 | Nomura et al. | 483/44 |
| 4,144,975 | 3/1979 | Tsuboi et al. | 483/39 |
| 4,300,278 | 11/1981 | Normura et al. | 483/44 |
| 5,749,819 | 5/1998 | Yan et al. | 483/39 |
| 5,823,722 | 10/1998 | Takenaka | 409/230 |
| 5,876,316 | 3/1999 | Kato | 483/39 |
| 5,928,120 | 7/1999 | Kameyama | 483/36 |

FOREIGN PATENT DOCUMENTS 155215  11/1992  Japan ......................... 483/39

*Primary Examiner*—Stephen F. Gerrity
*Assistant Examiner*—Adrian M. Wilson
*Attorney, Agent, or Firm*—Armstrong, Westerman Hattori, McLeland & Naughton

[57] ABSTRACT

An automatic tool exchanging machine include a machine body such as gear box, a tool exchanging arm having a tool grasping member and supported by the machine body to be rotatable and to be linearly reciprocally movable in an axial direction of a rotation shaft of the machine body, a rotation drive mechanism provided for the machine body, and a power transmission mechanism for transmitting a driving power of the rotation drive mechanism to the tool exchanging arm. The power transmission mechanism is provided with a motion conversion mechanism for converting a rotational motion of the rotation drive mechanism including servo-motors to a linear reciprocal motion of the tool exchanging arm and the motion conversion mechanism is composed of a feed screw mechanism. The feed screw mechanism is a ball screw mechanism.

6 Claims, 10 Drawing Sheets

FIG.7A
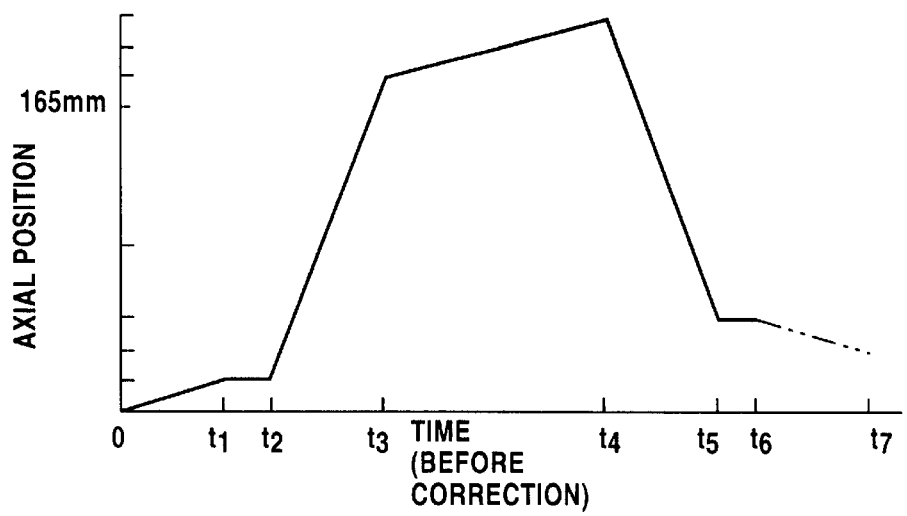
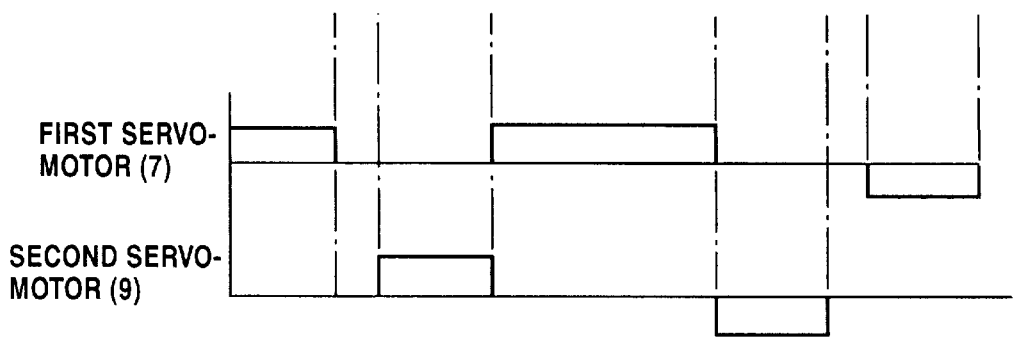
FIG.7B
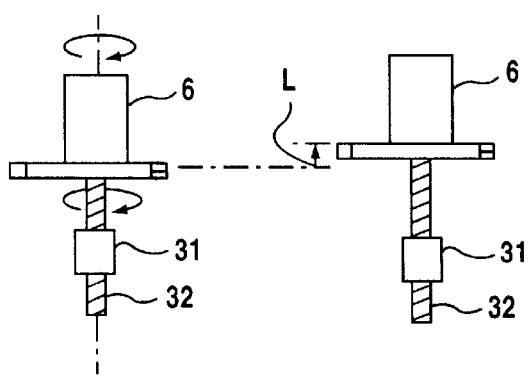 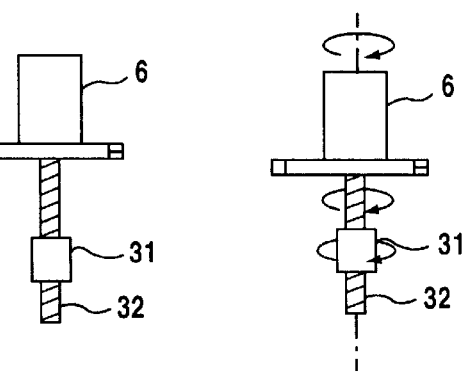 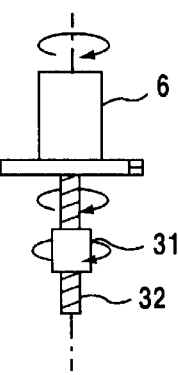
FIG.7C    FIG.7D    FIG.7E

AUTOMATIC TOOL EXCHANGING MACHINE

BACKGROUND OF THE INVENTION

The present invention relates to an automatic tool exchanging machine, provided for an NC machine such as machining center, for automatically exchanging a tool mounted to a spindle.

In general, a conventional automatic tool exchanging machine has a structure in which an tool exchanging arm is supported by a machine body so as to be freely rotatable and linearly reciprocally movable. The tool exchanging arm performs its rotational motion about an arm axis and performs its linear reciprocal motion in the arm axis direction. A pair of tool grasping portions for grasping tools are provided for both ends of the tool exchanging arm.

One of the basic or main objects of the machining center resides in the improvement in productivity, and particularly, it is an important technical matter to make short a time required for a tool exchanging operation by a tool exchanging machine (this requires about 20% time of the entire operation cycle time).

The tool exchanging operation for exchanging a tool mounted to a spindle by the tool exchanging machine includes the following detailed processes or operations.

(1) Operation for rotating a tool exchanging arm and grasping a used tool mounted to a spindle by one of tool grasping members (another one of tool grasping members grasps a tool to be next used).

(2) Operation for releasing the tool from a tool grasping member of the spindle for exchanging the used tool.

(3) Operation for linearly moving the tool exchanging arm in the axial direction of the spindle and remove a shank portion of the used tool from a tapered hole of the spindle.

(4) Operation for rotating the tool exchanging arm and exchanging the used tool with the tool to be next used (which may be called merely next tool hereinlater) aligned on the axial direction.

(5) Operation for linearly moving the tool exchanging arm and inserting the shank portion of the next tool into the tapered hole of the spindle.

(6) Operation for grasping the next tool by the grasping member of the spindle.

(7) Operation for rotating the tool exchanging arm and releasing the next tool mounted to the spindle from the tool exchanging arm.

Minor operations other than the above may be included thereafter.

The operations (1), (3)–(5) and (7) of the tool exchanging arm are functions generally provided for an automatic tool exchanging machine, and in a conventional structure, in order to linearly move the tool exchanging arm, a cam mechanism such as plate cam or positive motion cam as a motion conversion mechanism for converting a rotation motion of a rotation driving source to a linear motion of the tool exchanging arm has been used for a power transmission mechanism for transmitting a driving force from the driving source to the tool exchanging arm.

The conventional mechanism using the cam mechanism such as mentioned above has following defects or problems.

(a) Mechanical Problem

In the case of using the plate cam, it is necessary to press a contact against an outer contour of the cam and give a confining force to keep the operative connection. In order to keep this state, however, contacting pressure between the contact and the cam contour is increased, which will result in wearing of the cam or increasing of change of torque.

On the other hand, in the use of the positive motion cam, since a contact contacts the cam contour at two points, any confining force is not required. However, as the mechanism is operated at a high speed, slight elasticity of an actual part(s), loosening of an object member, and/or error caused in a manufacturing process will largely affect on the motion of the tool exchanging arm. This will result in shifting of the operation timing of the tool exchanging arm or shifting of the operational locus thereof from a predetermined locus, which may cause the tool exchanging mechanism to be erroneously operated.

(b) Space Problem

The positive motion cam comprises, for example, as shown in FIG. 10, a cam body 101 formed with a cam groove 100, a contact 102 engaged with the cam groove 100, and a cam follower member 103 to which the contact 102 is attached. According to such structure, in consideration of the side pressure applied to the contact 102, because it is impossible to reduce a curvature radius of the cam groove 100, it is difficult to locate such cam mechanism in a limited space.

(c) Cost Problem

Further, with reference to FIG. 10, it is necessary for the contact 102 to contact both side wall portions of the cam groove 100 at two points and it is also necessary to follow the motion of the contacting portion contacting to one side wall of the cam groove to the motion determined by the contact of the contacting portion contacting to the other one side wall. Accordingly, it is required to accurately work the side walls of the cam groove 100, and such groove working requires three-dimensional grooving and groove grinding workings, which require a much cost for installing a working equipment, and a cost for manufacturing each cam will be also increased.

SUMMARY OF THE INVENTION

An object of the present invention is to substantially eliminate problems or defects encountered in the prior art described above and to provide an automatic tool exchanging machine capable of smoothly and accurately performing a linear motion of a tool exchanging arm at a high speed.

This and other objects can be achieved according to the present invention by providing an automatic tool exchanging machine, comprising:

a machine body;

a tool exchanging arm having a tool grasping member and supported by the machine body to be rotatable and to be linearly reciprocally movable in an axial direction of a rotation shaft of the machine body;

a rotation drive mechanism provided for the machine body; and a power transmission mechanism for transmitting a driving power of the rotation drive mechanism to the tool exchanging arm, the power transmission mechanism being provided with a motion conversion mechanism for converting a rotational motion of the rotation drive mechanism to a linear reciprocal motion of the tool exchanging arm, the motion conversion mechanism being composed of a feed screw mechanism.

In a preferred embodiment, the feed screw mechanism is a ball screw mechanism.

The rotation drive mechanism includes a first rotation drive source for the linear motion of the tool exchanging arm and a second rotation drive source for the rotational motion thereof, the power transmission mechanism includes a first power transmission unit provided with a feed screw mechanism for transmitting a driving power of the first rotation drive source to the tool exchanging arm and a second power transmission unit for transmitting a driving power of the second rotation drive source, in which the feed screw mechanism comprises a nut and a screw shaft one of which is rotated and the other one of which is rotatably fixed with respect to the tool exchanging arm to be linearly movable. A control unit is further provided for the first and second rotation drive sources for controlling the rotation driving thereof so that when the tool exchanging arm is rotated, a relative rotation amount of the screw shaft and the nut of the feed screw mechanism due to the rotational motion of the tool exchanging arm becomes substantially zero.

The machine body is composed of a gear box which is mounted on a base through a linear motion guide device, the center shaft being mounted to the gear box in operative association therewith.

The first and second rotation drive units are composed of first and second servo-motors, respectively, and the first and second servo-motors are controlled by the control unit so as to be substantially synchronously driven with each other.

A center shaft having an inner hollow structure is mounted to the machine body to be rotatable, the tool exchanging arm is fitted to the hollow center shaft to be immovable in the rotational direction thereof and to be movable in the axial direction thereof, the feed screw mechanism for the first power transmission unit is disposed in a hollow portion of the center shaft at a portion between the machine body and the tool exchanging arm to be coaxial with the center shaft, and the second power transmission unit operates to transmit a power of the second rotation drive unit to the tool exchanging arm through the center shaft.

According to the tool exchanging machine of the structure mentioned above, since the feed screw mechanism is used as the motion conversion mechanism, the screw shaft and the nut perform the rotational motion along a screw groove with a constant lead angle, and accordingly, any rapid change of the torque cannot be caused as in the use of a cam mechanism to thereby smoothly transmit the driving power. Furthermore, since the nut and screw portion of the screw shaft are contacted without using a structure in which a contact is locally contacted to a cam, slight elasticity or slack of an actual product, or an error in manufacture can be averaged throughout the entire length of an engaging portion, thus less affecting the motion of the mechanisms constituting the tool exchanging machine and achieving a high speed linear feed motion.

Moreover, since the feed screw mechanism is arranged linearly along the linear motion direction, it is not necessary to provide a flat space such as for the location of the cam mechanism, reducing the location space. The backlash of the feed screw mechanism can be eliminated by using the ball screw mechanism as the feed screw mechanism, performing a precise feed of the tool exchanging arm. According to the ball screw mechanism, the friction between the nut and the screw shaft is a ball rolling friction and, hence, the friction loss at the driving torque conversion time is substantially ignored, thus achieving more smooth movement.

Furthermore, when the tool exchanging arm is rotated by the second rotation drive source, the nut and the screw shaft of the feed screw mechanism is relatively rotated to shift the tool exchanging arm in the axial direction. Then, by rotating the first and second rotation drive sources together, it is possible to rotate the tool exchanging arm in the same plane. In this operation, the first and second rotation drive sources may be controlled synchronously during the rotation or not controlled precisely during the rotation by determining the rotation starting position and finishing position by substantially synchronously driving the first and second rotation drive sources.

In the structure in which the feed screw mechanism is accommodated in the hollow center shaft supporting the tool exchanging arm, the location space of the machine can be further saved.

The nature and further characteristic features of the present invention will be made more clear from the following descriptions made with reference to the accompanying drawings.

BRIEF DESCRIPTION OF THE DRAWINGS

In the accompanying drawings:

FIG. 7A is a diagram showing an operation in the axial direction of the tool exchanging arm before correction at a time when only the second servo-motor is rotated, FIG. 7B is a timing chart of the first and second servo-motors in the case of FIG. 7A, FIGS. 7C and 7D are views showing operations of the tool exchanging arm, a ball screw shaft and a ball nut before the correction in relation to FIG. 7A, and FIG. 7E is a view showing operations of the tool exchanging arm, the ball screw shaft and the ball nut after the correction at the time of rotating the tool exchanging arm;

DESCRIPTION OF THE PREFERRED EMBODIMENT

Figure 1:
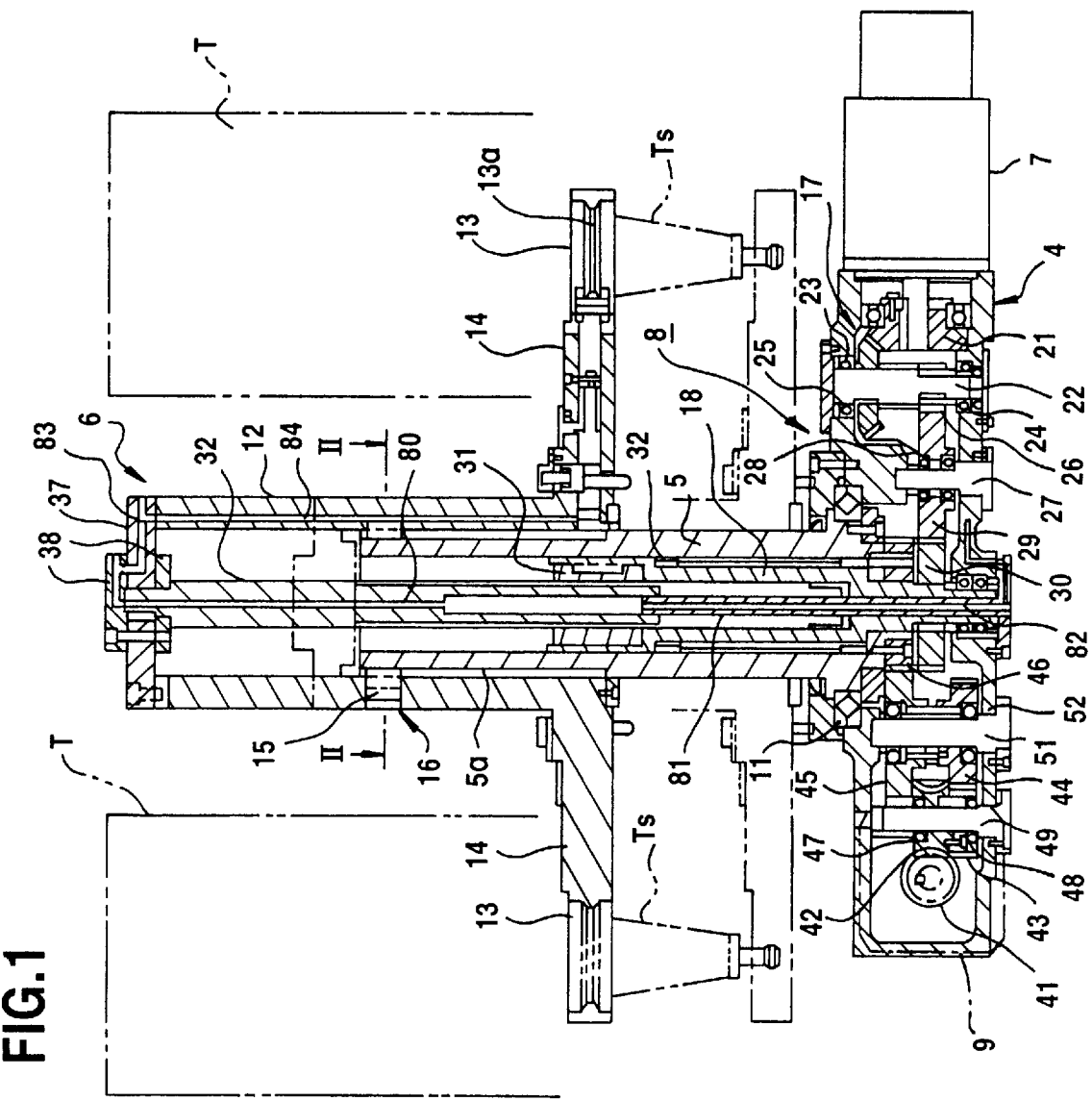
FIG. 1 is a sectional view taken along the line I—I in FIG. 3, later mentioned, of one embodiment of an automatic tool exchanging machine according to the present invention.

One preferred embodiment of an automatic tool exchanging machine according to the present invention will be described hereunder first with reference to FIGS. 1 to 4.

An automatic tool exchanging machine 1 comprises: a gear box 4, as a machine body, mounted on a base 2 through a linear motion guide device 3; a center shaft 5 having an inner hollow structure and supported by the gear box 4 to be rotatable but not to be movable in an axial direction thereof; a tool exchanging arm 6 fitted around an outer periphery of the center shaft 5 not to be relatively rotatable with respect to the center shaft 5 but to be relatively movable with respect to the center shaft 5 in the axial direction; a first servo-motor 7 provided for the gear box 4 as a first rotation drive source; a first power transmission mechanism 8 for transmitting a driving force of the first servo-motor 7 to the tool exchanging arm 6; a second servo-motor 9 provided for the gear box 4, independently from the first servo-motor 7 as a second rotation drive source; and a second power transmission mechanism 10 for transmitting a driving force of the second servo-motor 9 to the tool exchanging arm 6.

The center shaft 5 is composed of a cylindrical hollow shaft member mounted to the gear box 4 so as to stand upward in an installed state, and one end of the center shaft 5 is supported by the gear box 4 through a bearing 11 not to be rotatable in an axial direction thereof but to be movable in a rotational direction thereof. The other one end of the center shaft 5 is a free end.

The tool exchanging arm 6 is composed of a guide cylinder 12 to be fitted to the outer periphery of the center shaft 5 and a pair of tool holding arm members 14 extending from one end of the guide cylinder 12 on the gear box side in opposing directions (180° direction) to each other, and tool grasping members 13 are mounted to extending ends of the tool holding portions 14, respectively. Each of the tool grasping members 13 is provided with a semi-circular claw member 13a opened in the rotational direction in a manner that the claw member 13a is engaged with a groove formed to a shank portion Ts of a tool T through a rotational motion of the tool exchanging arm.

A key groove 5a is formed to the outer periphery of the center shaft 5, and a key holder 16 having a key 15 engageable with the key groove 5a is formed to the guide cylinder 12.

The first power transmission mechanism 8 is composed of a rotational motion transmission unit 17 for transmitting the rotational motion and a ball screw unit 30 as feed screw mechanism constituting a motion converting member for converting the rotational motion to the linear motion.

The rotational motion transmission unit 17 is an assembly for transmitting the rotational motion of the first servo-motor 7 as the first drive source to the ball screw unit 30 and is composed of a bevel gear 21 mounted to a power output shaft of the first servo-motor 7 secured to the gear box 4, another bevel gear 25 mounted to a shaft 22 and meshed with the bevel gear 21, a spur gear 26 coaxially disposed with the bevel gear 25, another spur gear 29 meshed with the spur gear 26, and a further spur gear 40 mounted to a nut shaft 18 so as to be meshed with the spur gear 29. The bevel gear 21 is supported to the gear box 4 through the bearing 20, and the bevel gear 25 and the spur gear 26 are fixedly mounted to the same shaft 22 supported to be rotatable to the gear box 4 through bearings 23 and 24. The spur gear 29 is supported by the fixed shaft 27 fixed to the gear box 4 through a bearing 28 to be rotatable.

Figure 2A:
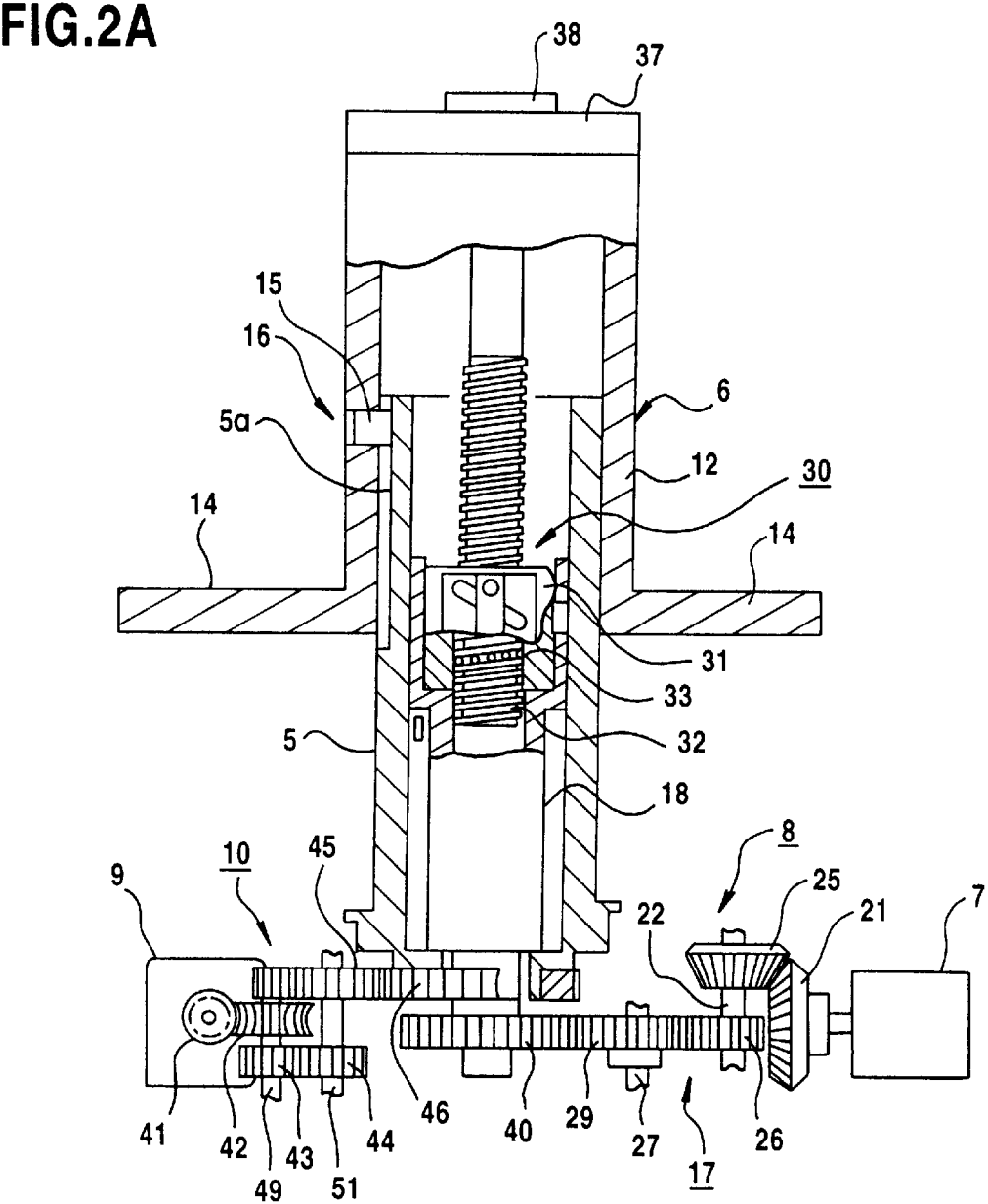
FIG. 2A is a sectional view showing a power transmission mechanism of the tool exchanging machine of FIG. 1

The ball screw unit 30 is disposed inside the hollow structure of the center shaft 5 at a portion between the gear box 4 and the tool exchanging arm 6. The ball screw unit 30 is an assembly composed of, as shown in FIG. 2A, a ball nut 31, ball screw shaft 32 and a number of balls 33 fitted to be rolled between screw grooves of the ball screw shaft 32. In an example shown in FIG. 2A, the nut shaft 31 of the ball screw unit 30 is supported to be rotatable by the gear box 4 through a hollow nut shaft 18 in a manner that the ball screw shaft 32 is linearly reciprocally movable by the rotational motion of the ball nut 31.

The nut shaft 18 has an inner hollow structure coaxially disposed inside the center shaft 5 and having one end rotatably supported by the gear box 4 through a bearing 34 and another end to which the ball nut 31 of the ball screw unit 30 is mounted. The intermediate outer peripheral portion of the nut shaft 18 is supported to be rotatable to the inner periphery of the center shaft 5 through a bearing 35. A nut holder 19 is provided for the other end of the nut shaft 18 and the ball nut 31 is held by this nut holder 19 not to be movable in the axial direction thereof. The nut holder 19 and the ball nut 31 are locked by means of key 36 and are hence rotated integrally together.

The ball screw shaft 32 has one shaft end which is coupled to the guide cylinder 12 of the tool exchanging arm 6 through a cap 37. That is, the cap 37 is secured to the end portion of the ball screw shaft 32 so as to be snapped by a cap holder 38, and the cap 37 is fastened to the front end of the guide cylinder 12 so that the linear reciprocal motion of the ball screw shaft 32 is transmitted as it is to the tool exchanging arm 6.

According to the structure mentioned above, the torque generated by the first servo-motor 7 is transmitted to the nut shaft 18 through the bevel gears 21 and 22 and the spur gears 26, 29 and 30 in this order and then transmitted to the ball nut 31 of the ball screw unit 30. The rotational force of the ball nut 31 is smoothly converted to the ball screw shaft 32 and then transmitted to the tool exchanging arm 6 through the cap holder 38 and the cap 37.

In order to convert the rotational motion of the ball nut 31 to the linear reciprocal motion of the ball screw shaft 32, it is necessary to provide a rotation-stop means to prevent the ball screw shaft 32 from being rotated together with the ball nut 31. In the embodiment of the present invention, this rotation-stop function of the ball screw shaft 32 is applied by fixing the ball screw shaft 32 integrally to the tool exchanging arm 6. That is, more concretely, a rotation prevention key 39 is provided between the ball screw shaft 32 and the cap 37 fixed to the shaft end thereof to rotate the ball screw shaft 32 integrally together with the tool exchanging arm 6.

Furthermore, the ball screw shaft 32 is formed with a working oil passage 80 along the central axis thereof for surely holding the tool grasping members 13, and the working oil passage 80 has an end opening on the gear box side so that a guide shaft 81 is inserted thereinto to be relatively movable in the axial direction. The guide shaft 81 is inserted into the nut shaft 18 and has one end fixed to the gear box 4, and has another end inserted into working oil passage 80 of the ball screw shaft 32. And another working oil passage 82 communicating with the working oil passage 80 is formed to the guide shaft 81.

The cap 37 and the cap holder 38 are also formed with a working oil passage 83 through which the working oil passage 80 and a working oil passage 84 formed to the guide cylinder 12 are communicated with each other.

Incidentally, the second power transmission mechanism 10 is a rotational motion transmission means for transmitting a rotational motion of the second servo-motor 9 to the center shaft 5, which is composed of a gear transmission in the present embodiment.

Figure 2B:
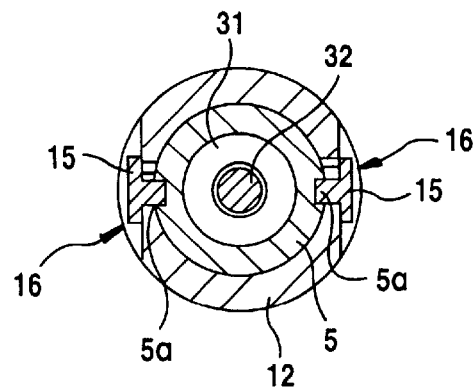
FIG. 2B is a sectional view taken along the line IIB—IIB in FIG. 1.
Figure 3:
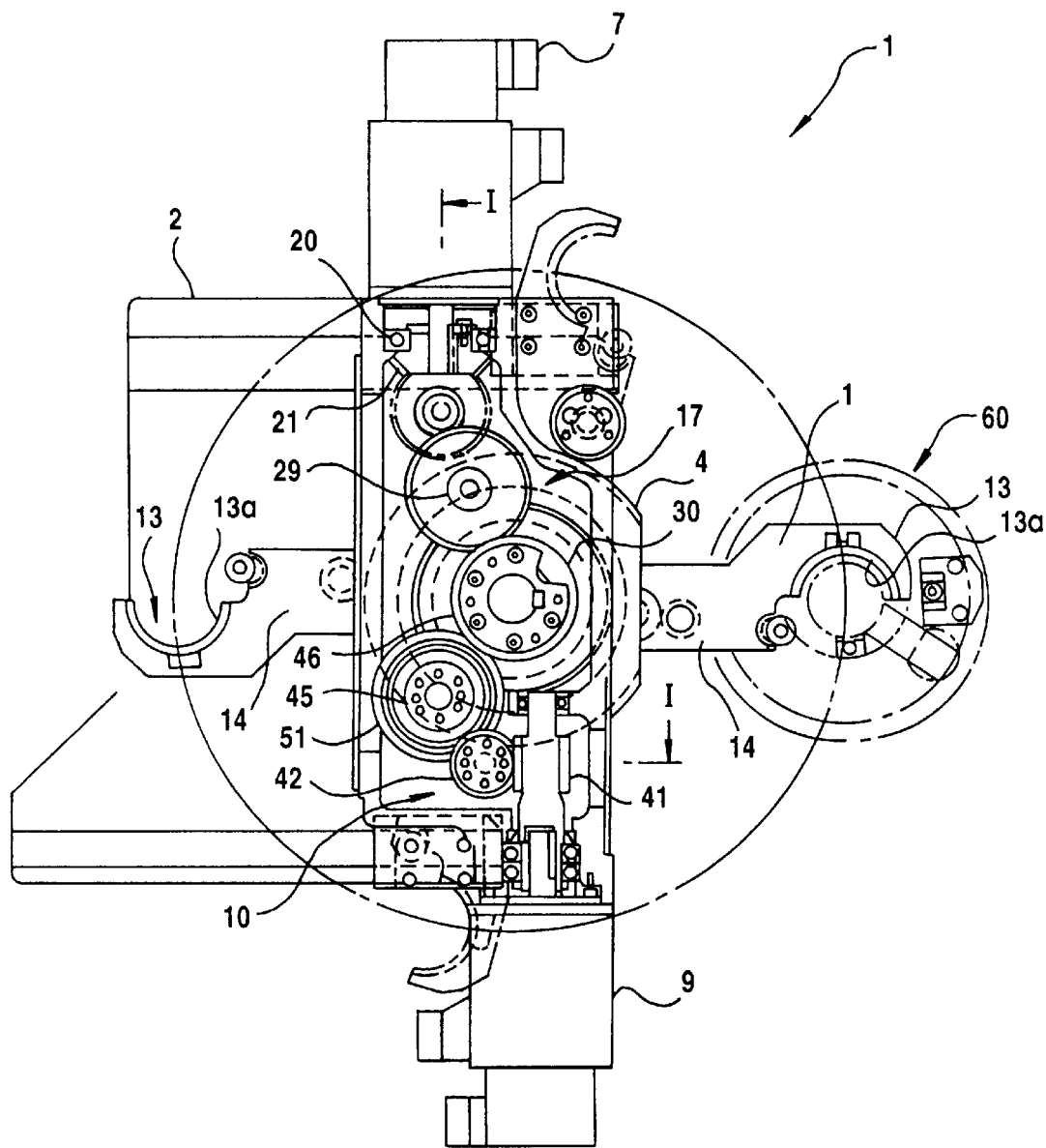
FIG. 3 is a sectional view taken along the line III—III in FIG. 4, later mentioned.
Figure 4:
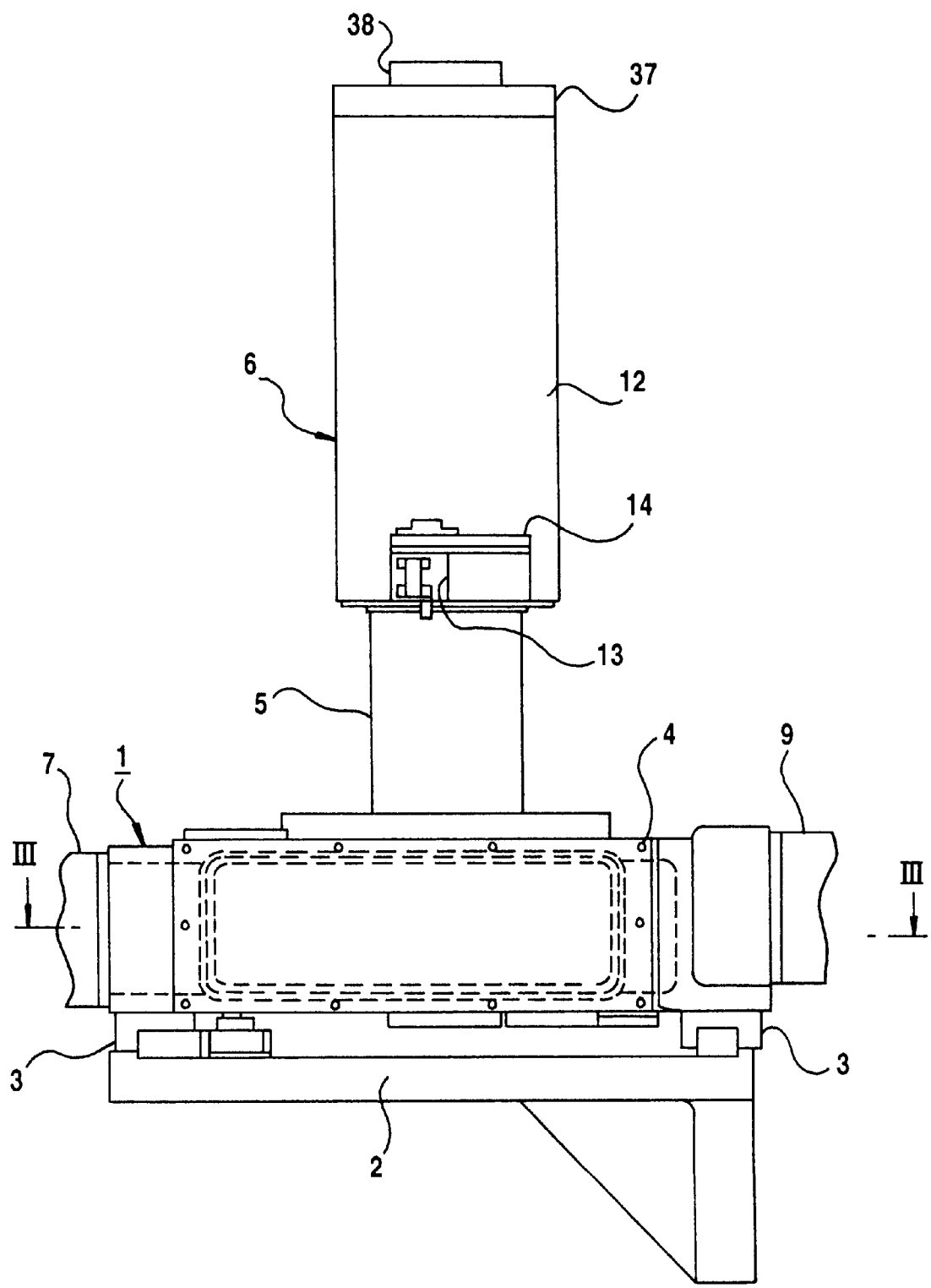
FIG. 4 is a side view of the tool exchanging machine of the present invention.

That is, the second power transmission mechanism 10 is composed, as shown in FIG. 2, of a worm 41 mounted to an output shaft of the second servo-motor 9, a worm wheel 42 meshed with the worm 41, a spur gear 43 integrally fastened to the worm wheel 42, a spur gear 44 meshed with the spur gear 43, a spur gear 45 coaxially meshed with the spur gear 44, and a spur gear 46 fastened to the center shaft 5 meshed with the spur gear 45.

The worm 41 is supported rotatably to the gear box 4 through bearings 47 and 48, and the worm wheel 42 is supported to the gear box 4 to be rotatable, through a bearing 50, about a shaft fixed to the gear box 4. The spur gear 43 is also supported to the gear box 4 to be rotatable, through a bearing 52, about a shaft 51 fixed to the gear box 4.

According to the structure mentioned above, the torque generated by the second servo-motor 9 is transmitted to the center shaft 5 through the worm 41, the worm wheel 42, and the spur gears 43, 44, 45 and 46 in this order and then transmitted to the key holder 16 and the tool exchanging arm 6.

As mentioned above, the tool exchanging machine according to the present invention is provided with the first and second servo-motors 7 and 9 as driving sources for the linear motion and the rotational motion of the tool exchanging arm 6 and the first power transmission mechanism 8 for the power transmission from the first servo-motor 7 for the linear motion to the tool exchanging arm 6 is provided with the feed screw mechanism such as ball screw unit 30, so that the smooth tool exchanging operation can be realized at a high speed without using a cam mechanism.

Further, it is to be noted that in the embodiment described above, although the gear transmission mechanisms are utilized as the rotational motion transmission unit 17 of the first power transmission mechanism 8 and the second power transmission mechanism 10, other mechanisms such as wrapping-type transmission mechanism using a timing belt, for example, may be utilized in place of them.

The automatic tool exchanging machine of the structure mentioned above will operate in the following manner with reference to FIGS. 5 and 6.

Figure 5A:
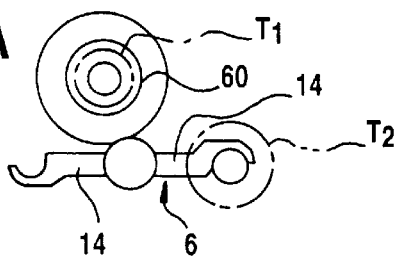
FIG. 5 includes FIGS. 5A to 5H for explaining an operation of a tool exchanging arm.

FIG. 5A shows a waiting state for the tool exchanging. That is, with reference to FIG. 5A, one of the tool holding arm members 14 of the tool exchanging arm 6 grasps a tool T2 which will be used in the next working and the other one of the tool holding arm members 14 waits with no tool (empty state). This position is made as an original position for the rotational motion and the linear motion of the tool exchanging arm 6.

Figure 5E:
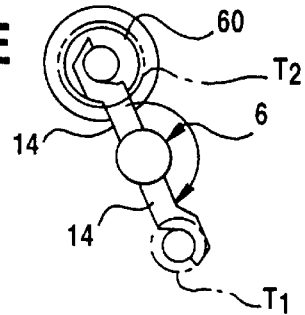
Figure 5B:
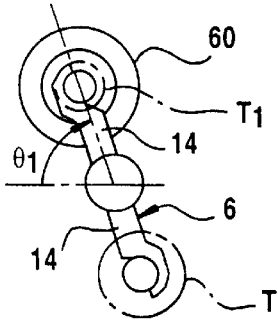
Figure 5F:
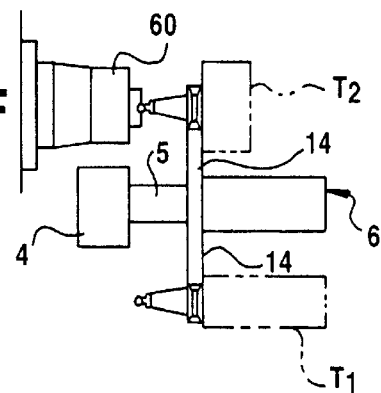
Figure 5C:
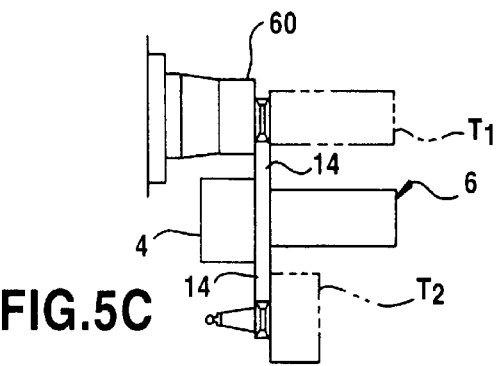

FIGS. 5B and 5C show a state of the tool exchanging arm 6 rotated in a clockwise direction from the original position shown in FIG. 5A by a predetermined angle of, for example, θ1 (75° in the illustrated example), in which a tool T1, which has been used, mounted to the spindle 60 is grasped by the empty tool holding arm member 14.

Figure 6A:
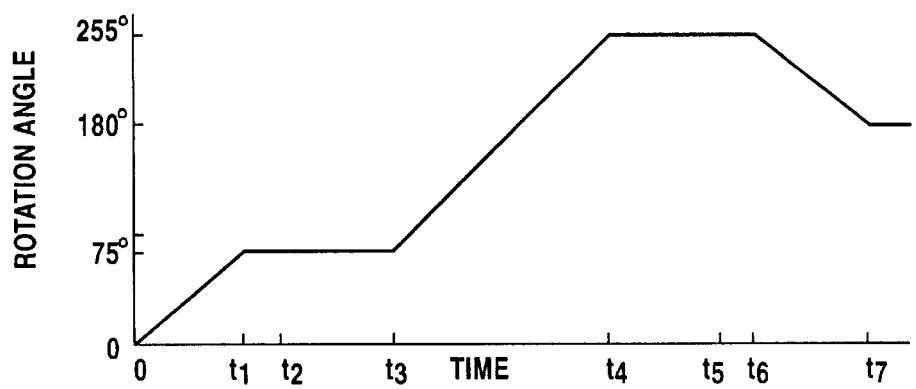
FIG. 6A is a diagram showing an operation in a rotational direction of the tool exchanging arm.

The above motion is represented by an area from 0 to t1 on the performance chart of FIG. 6A showing that the tool exchanging arm 6 is rotated by 75° from the original position in the clockwise direction and then stops. In this motion, the exchanging arm 6 is not moved in the axial direction and stops at the original position as represented by the performance chart of FIG. 6B.

Figure 5G:
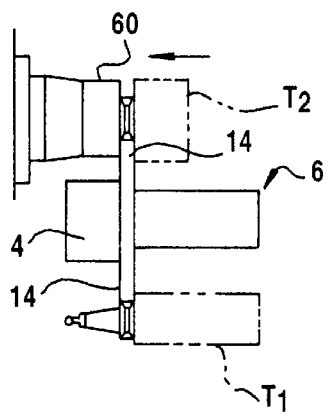
Figure 5D:
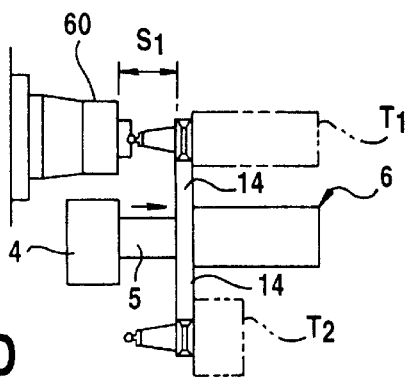

In the next step, the tool grasping device, not shown, of the spindle 60 is released and, as shown in FIG. 5D, the tool exchanging arm 6 is expanded by a predetermined stroke S1 in the axial direction and takes out the used tool T1 from the tapered hole, not shown, of the spindle 60.

Figure 6B:
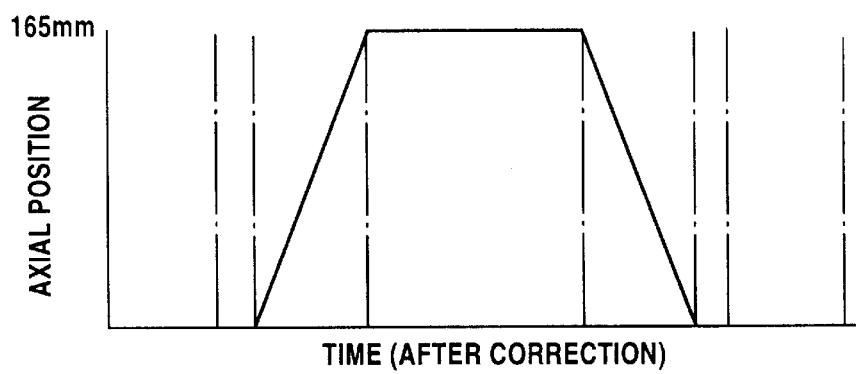
FIG. 6B is a diagram showing an operation in an axial direction thereof.

With reference to the performance charts of FIGS. 6A and 6B, the releasing of the tool grasping operation of the spindle is performed during a time of t1–t2 and the expansion of the tool exchanging arm 6 is performed during a time of t2–t3. During the time of t1–t2, the exchanging arm 6 is maintained in operation stopping state in the rotational direction and axial direction, and when the tool grasping operation by the spindle 60 is released, the tool exchanging arm 6 is moved by the stroke of 165 mm and then stopped as shown in FIG. 6B, and in this time, the rotational angle of 75° is maintained as shown in FIG. 6A.

Next, as shown in FIGS. 5E and 5F, the tool exchanging arm 6 is rotated by 180° with a state of grasping the used tool T1 and a tool T2 to be next used so that the next tool T2 is positioned on the axial line of the spindle 60. This rotational motion is performed in an interval (area) of a time of t3–t4 on the performance chart of FIGS. 6A and 6B, and as shown in FIG. 6A, the tool exchanging arm 6 is rotated from the 75° rotating position to the 255° rotating position with a stroke of 165 mm and then stopped.

Then, as shown in FIG. 5G, the tool exchanging arm 6 is moved backward by the stroke S1 at the time of the tool draw-out operation and the next tool T2 is inserted into the tapered hole of the spindle 60 and grasped by the tool grasping device of the spindle 60.

As represented by the performance charts of FIGS. 6A and 6B, the tool grasping operation is performed during a time of t5–t6 and the expansion operation of the tool exchanging arm 6 is performed during a time of t6–t7. During the time of t5–t6, the tool exchanging arm 6 is maintained in the stopped state in the rotational direction and the axial direction thereof, and when the tool grasping operation of the tool grasping device of the spindle 60 has been completed, the tool exchanging arm 6 is moved in the reverse direction with the stroke of 165 mm and then stopped. During this time, the state of the rotational angle of 255° has been maintained as shown in FIG. 6A.

Figure 5H:
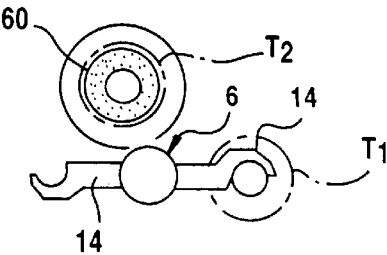

Next, as shown in FIG. 5H, the tool exchanging arm 6 is rotated by a predetermined angle θ1 in a direction reverse to the direction in the tool grasping operation to thereby remove the used tool T1 from the tool holding arm member 14. This releasing operation is represented by an interval (area) of a time of t6–t7 in FIGS. 6A and 6B, and as shown in FIG. 6B, the tool exchanging arm 6 is rotated reversely from the 255° rotated state to the 180° rotated state and then stopped. During this time, the stroke in the linear motion direction is maintained to zero (0) as shown in FIG. 6B.

Next, the control manner or sequence of the first and second servo-motors 7 and 9 at the time of rotating the tool exchanging arm 6 of the structure mentioned above will be described hereunder with reference to FIG. 7.

Only the second servo-motor 9 is driven, for rotating the tool exchanging arm 6, at the time interval (0 to t1) of the grasping operation of the used (after working the tool) tool T1, the time interval (t3 to t4) of the reverse rotation operation of the used tool T1 and the tool T2 to be next used (to be newly exchanged) and the time interval (t4 to t5) of the tool releasing operation of the next tool T2. In such operations, as shown in FIG. 7B, at the time when only the second servo-motor 9 is driven, the ball screw shaft 32 is relatively rotated to the ball nut 31 according to the rotation of the tool exchanging arm 6, and hence, the tool exchanging arm 6 is linearly moved by a predetermined amount L in the axial direction as shown in FIGS. 7C and 7D, and accordingly, the axial position of the tool exchanging arm 6 is shifted from the target position as shown in FIG. 7A.

For example, in a case where the tool exchanging arm 6 is rotated by an angle of θ, the cap 37 engaged with the tool exchanging arm 6 and the ball screw shaft engaged with the cap 37 through the key 39 are also rotated by the angle θ in accordance with the rotation of the tool exchanging arm 6. During this operation, since the ball nut 31 is restricted in the rotational direction, the tool exchanging arm 6 is excessively moved by an amount represented by (linear motion amount L of the ball screw shaft 32=(lead of the ball screw)×(the tool exchanging arm rotating angle θ/360°)).

Figure 6C:
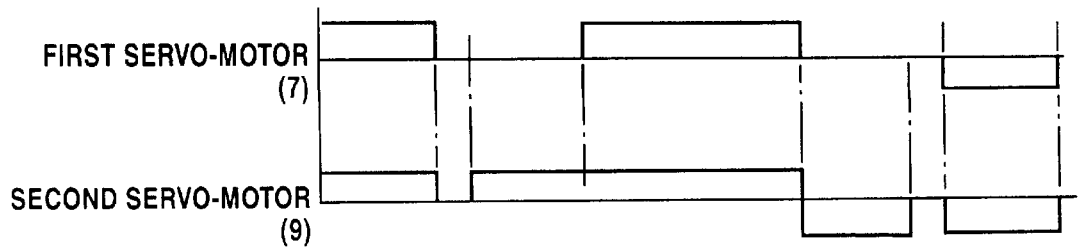
FIG. 6C is a timing chart of first and second serve-motors.

However, since the shank portion of the tool T2 is to be moved by a predetermined amount, the ball nut 31 is to be synchronously rotated in the same direction of the ball screw shaft 32 as shown in FIG. 7E so that the linear motion amount L is made zero (0). That is, according to the present invention, as shown in FIG. 6C, the control is made in the manner such that first and second servo-motors 7 and 9 are simultaneously driven so as to rotate both the ball screw shaft 32 and the ball nut 31 together at the same speed to thereby make zero the relative rotation amounts of the ball nut 31 and the ball screw shaft 32 of the ball screw unit 30 due to the rotational motion of the tool exchanging arm 6, and according to such control manner, the movement of the ball screw shaft in the axial direction can be restricted, and hence, the tool exchanging arm 6 can be rotated in the same plane.

Further, in the above control manner, the control of the driving of the first and second servo-motors 7 and 9 may be made through the precise synchronism by means of servo-control during the rotation, or the control of the driving of the first and second servo-motors 7 and 9 may be driven only by determining the rotation starting position and the rotation finishing position without precisely controlling during the rotation. In this meaning, it may be merely obliged for the first and second servo-motors 7 and 9 to be controlled so as to be driven in substantially the synchronous manner.

Figure 8:
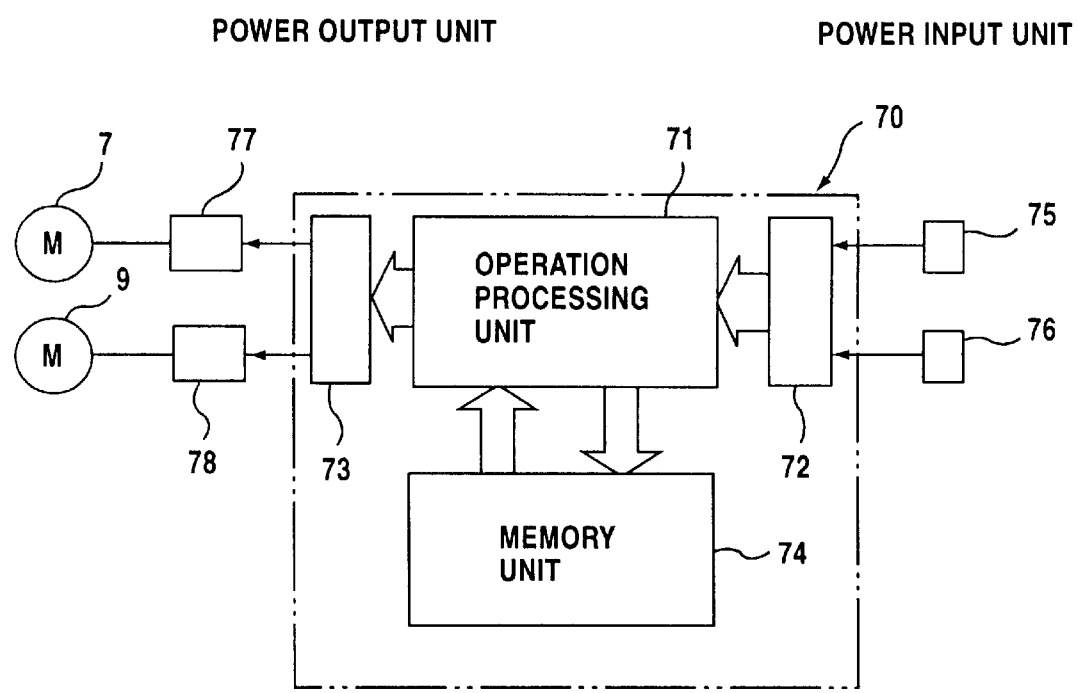
FIG. 8 is a block diagram for controlling the first and second servo-motors.

FIG. 8 shows a block diagram of a control unit as control means for controlling the first and second servo-motors 7 and 9 of the characters mentioned above.

With reference to FIG. 8, a control unit 70 includes an operation processing section 71 such as CPU, an input section 72, an output section 73 and a memory section 74, which are operatively connected to each other, in which control signals are outputted to driving circuits 77 and 78, respectively, of the first and second servo-motors 7 and 9 in accordance with an operation program stored in the memory section 74. The rotational angle and the axial stroke of the tool exchanging arm 6 are detected by an angle sensor 75 and a position sensor 76, or encoders, not shown, for detecting the rotational angles of the first and second servo-motors 7 and 9, which are then fed back to the operation processing section 71.

Figure 9:
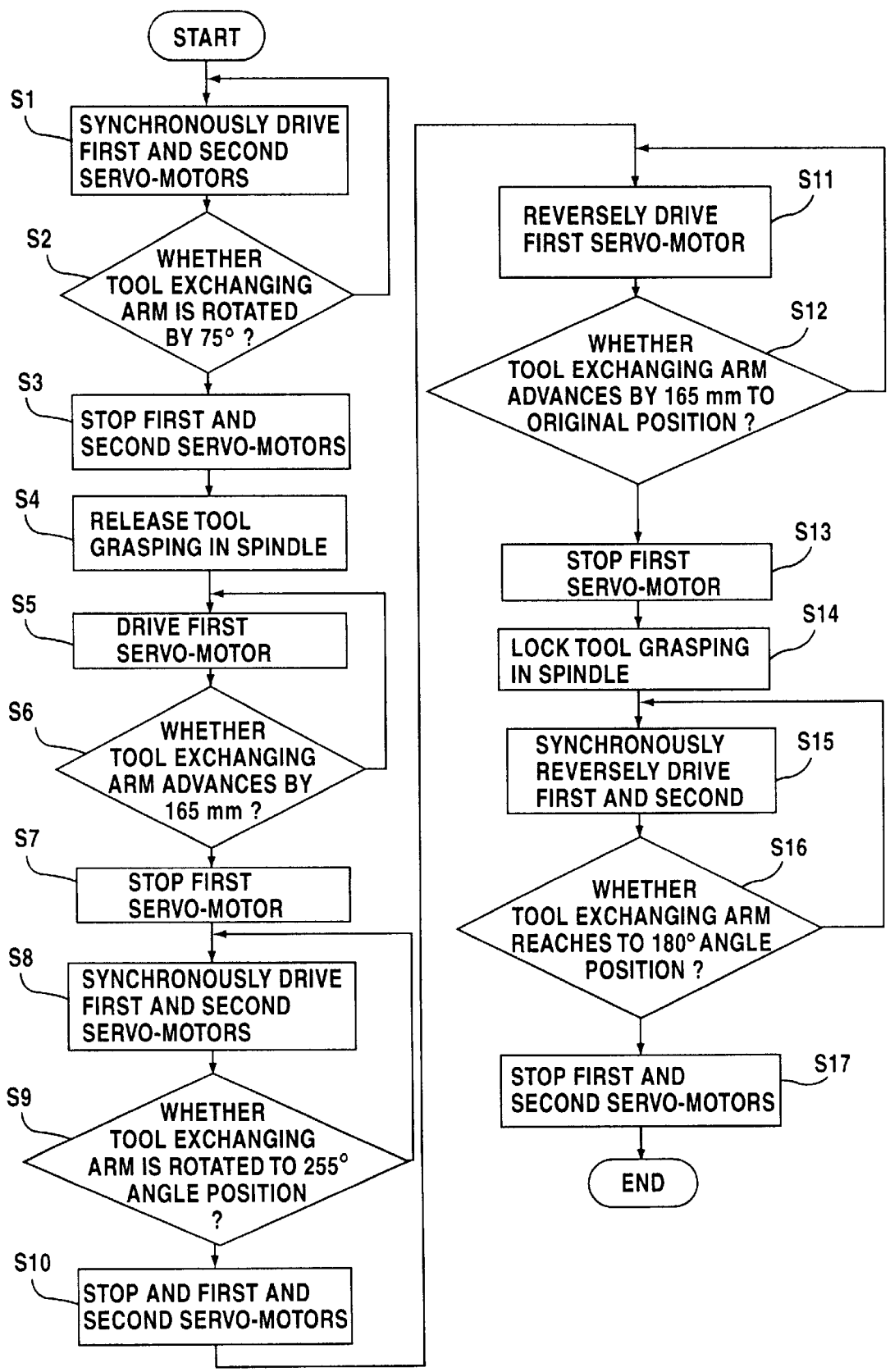
FIG. 9 is a flowchart showing one example of control sequence of the first and second servo-motors for performing the operations of FIGS. 6A and 6B.
Figure 10:
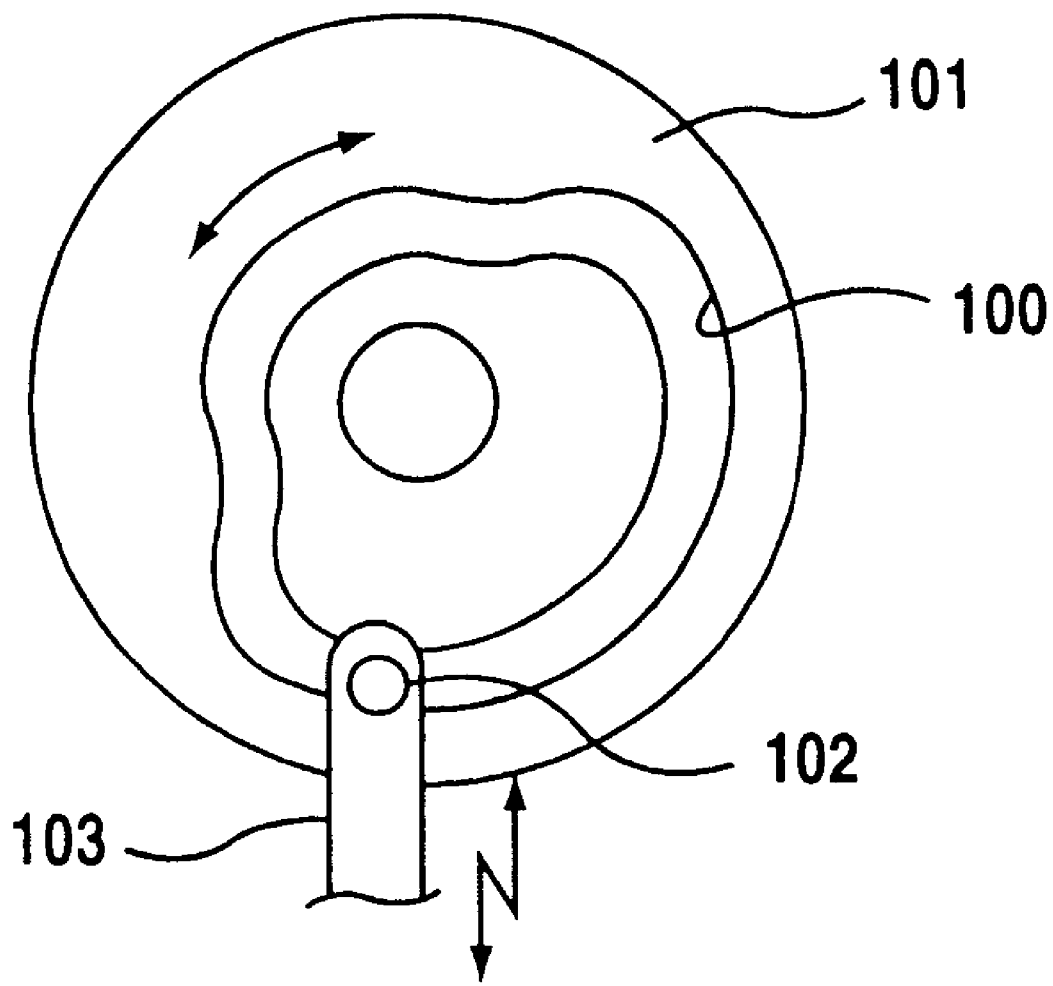
FIG. 10 is a schematic view showing one example of a positive motion cam used for a conventional automatic tool exchanging machine.

FIG. 9 represents one example of a control flowchart of the first and second servo-motors 7 and 9.

With reference to the flowchart of FIG. 9, first, the first and second servo-motors 7 and 9 are driven in a synchronous manner with each other (step S1). The rotational speeds of the first and second servo-motors 7 and 9 can be operated by a gear ratio of the respective power transmitting mechanisms. When the tool exchanging arm 6 rotates by the angle of 75°, the first and second servo-motors 7 and 9 stop (steps S2 and S3), and in this time, the used tool T1 mounted to the spindle 60 is grasped by the tool exchanging arm 6.

In the next step S4, the tool in the spindle 60 is released. Then, only the fist servo-motor 7 is driven so as to advance the tool exchanging arm 6, and at a time when the tool exchanging arm 6 advances by 165 mm, the first servo-motor 7 stops (steps S5 to S7). According to these steps, the used tool T1 is drawn out from the spindle 60.

In the next step S8, the first and second servo-motors 7 and 9 are both driven in the synchronous manner, and when the tool exchanging arm 6 is rotated to a position of the rotational angle of 255°, the first and second servo-motors 7 and 9 stop (steps S9 and S10). At this time, the tool T2 to be next used is positioned on the axial line of the spindle 60.

Furthermore, in the next step S11, only the servo-motor 9 is driven to be reversely rotated, and when the tool exchanging arm 6 is driven backward by 165 mm to take the initial position, at which the first servo-motor 7 stops (steps S12 and S13). At this time, the shank portion of the next tool T2 is inserted into the tapered hole of the spindle 60. Then, the tool grasping device in the spindle 60 is operated so as to grasp the next tool T2 (step S14).

In the next step S15, the first and second servo-motors 7 and 9 are driven so as to be reversely rotated in synchronism with each other, and when the tool exchanging arm 6 is rotated to a position of the rotational angle of 180°, the first and second servo-motors 7 and 9 stop (steps S16 and S17). At this time, the next tool T2 is released from the tool exchanging arm 6.

According to the steps mentioned above, during the rotating motion of the tool exchanging arm 6, the first servo-motor 7 is driven in synchronism with the second servo-motor 9 so that the ball nut 31 is rotated in the same rotating direction of the tool exchanging arm 6 and at the same rotating speed of the tool exchanging arm 6.

As mentioned above, according to the preferred embodiment of the present invention, the feed screw mechanism is provided as a mechanism for transmitting power from the rotation driving source for the linear motion of the tool exchanging arm to the tool exchanging arm, so that the exact tool exchanging operation can be smoothly achieved at a high speed without using any cam mechanism. The use of the ball screw mechanism such as feed screw mechanism can further improve the smooth tool exchanging operation at a further high speed.

Further, it is to be noted that the present invention is not limited to the described embodiment and many other changes and modifications may be made without departing from the scopes of the appended claims.

For example, in a modified embodiment, a slide-contact type feed screw mechanism may be utilized in place of the ball screw mechanism 30 as the feed screw mechanism.

Furthermore, in the described embodiment, although there is adopted the structure that the ball screw shaft 32 is linearly moved by rotating the ball nut 31, there may be adopted a structure that the ball screw shaft 32 is rotated to linearly move the ball nut 31, which is fixed to the tool exchanging arm 6.

Furthermore, in the described embodiment, although the rotation of the ball screw shaft 32 is restricted by fixing it to the tool exchanging arm 6, the rotation thereof may be prevented by the guide shaft 81 which is inserted into the operation oil passage 80 at the end portion of the ball screw shaft 32 on the side of the gear box 4. In such arrangement, the tool exchanging arm 6 and the ball screw shaft 32 will be coupled to be fixed in the axial direction by means of a bearing and to be movable in the rotational direction thereof.

Still furthermore, in the described embodiment, although the tool grasping portion 13*a* of the tool exchanging arm 6 has a half-moon shape to be released in the rotational direction so as to grasp the tool, there may be adopted a structure by which the grasping operation is performed by the linear feed operation of the gear box 4 with respect to the base 2 to provide the half-moon shape structure to be released in the radial direction.

What is claimed is:

1. An automatic tool exchanging machine comprising:

a machine body;

a tool exchanging arm having a tool grasping member and supported by the machine body to be rotatable and to be linearly reciprocally movable in an axial direction of a center shaft of the machine body;

a rotation drive mechanism provided for the machine body; and a power transmission mechanism for transmitting a driving power of the rotation drive mechanism to the tool exchanging arm, said power transmission mechanism being provided with a motion conversion mechanism for converting a rotational motion of the rotation drive mechanism to a linear reciprocal motion of the tool exchanging arm, and said motion conversion mechanism being composed of a feed screw mechanism, wherein said feed screw mechanism is a ball screw mechanism.

2. An automatic tool exchanging machine comprising:

a machine body;

a tool exchanging arm having a tool grasping member and supported by the machine body to be rotatable and to be linearly reciprocally movable in an axial direction of a center shaft of the machine body;

a rotation drive mechanism provided for the machine body; and a power transmission mechanism for transmitting a driving power of the rotation drive mechanism to the tool exchanging arm, said power transmission mechanism being provided with a motion conversion mechanism for converting a rotational motion of the rotation drive mechanism to a linear reciprocal motion of the tool exchanging arm, and said motion conversion mechanism being composed of a feed screw mechanism, wherein said rotation drive mechanism includes a first rotation drive source for the linear motion of the tool exchanging arm and a second rotation drive source for the rotational motion thereof, said power transmission mechanism includes a first power transmission unit provided with a feed screw mechanism for transmitting a driving power of the first rotation drive source to the tool exchanging arm and a second power transmission unit for transmitting a driving power of the second rotation drive source, wherein said feed screw mechanism is composed of a nut and a screw shaft one of which is rotated and the other one of which is rotatably fixed with respect to the tool exchanging arm to be linearly movable, and further comprising a control means provided for said first and second rotation drive sources for controlling the rotation driving thereof so that when the tool exchanging arm is rotated, a relative rotation amount of the screw shaft and the nut of said feed screw mechanism due to the rotational motion of the tool exchanging arm becomes substantially zero.

3. An automatic tool exchanging machine according to claim 2, wherein said machine body is composed of a gear box which is mounted on a base through a linear motion guide device, said center shaft being mounted to said gear box in operative association therewith.

4. An automatic tool exchanging machine according to claim 2, wherein said first and second rotation drive units are composed of first and second servo-motors, respectively.

5. An automatic tool exchanging machine according to claim 4, wherein said first and second servo-motors are controlled by said control means so as to be substantially synchronously driven with each other.

6. An automatic tool exchanging machine according to claim 2, wherein a hollow center shaft is mounted to said machine body to be rotatable, said tool exchanging arm is fitted to said hollow center shaft to be immovable in the rotational direction thereof and to be movable in the axial direction thereof and wherein said feed screw mechanism for the first power transmission unit is disposed in a hollow portion of the center shaft at a portion between the machine body and the tool exchanging arm to be coaxial with the center shaft and said second power transmission unit operates to transmit a power of the second rotation drive unit to the tool exchanging arm through the center shaft.

* * * * *